Patented July 5, 1932

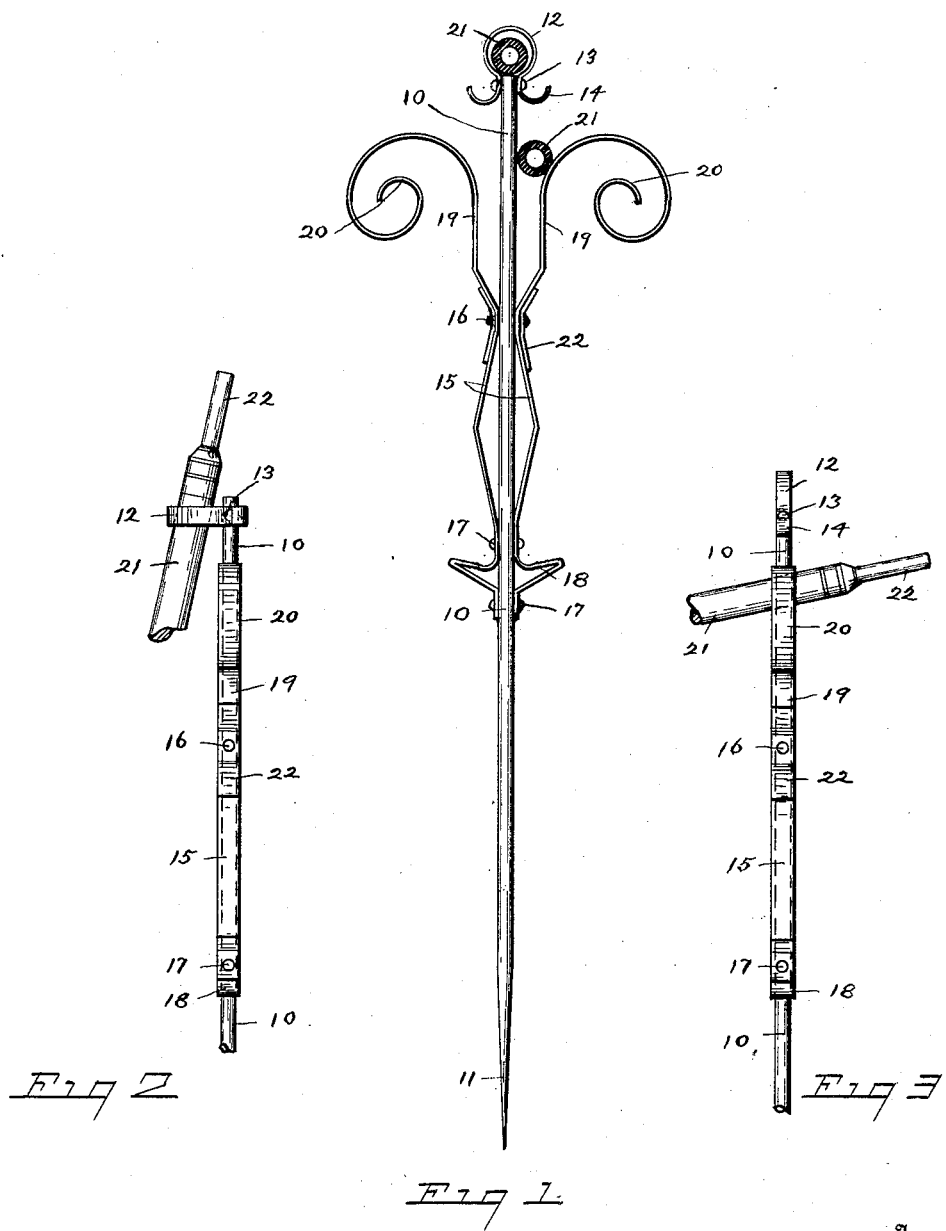

1,865,989

UNITED STATES PATENT OFFICE

FLOYD S. WILBER AND ATWATER W. HOLLISTER, OF KINGSTON, NEW YORK

GARDEN HOSE SUPPORTER

Application filed September 15, 1931. Serial No. 562,846.

This invention relates to a garden hose supporter, of that class which is intended to be temporarily forced into the ground for the purpose of supporting the nozzle end of a garden hose to direct its stream in the desired direction.

While there are several hose supports of different designs, it is found that in most cases the hose or nozzle is clamped thereto, which is an undesirable feature as it is important that the hose be quickly removed or adjusted to another position without the necessity of having to shut off the water, as is the case when the hose or nozzle is clamped to the support requiring time to remove or adjust.

The object of the invention is to provide an article of this class that shall be simple, durable and efficient, contain few parts and be readily adaptable to the work required.

Another object of the invention is to provide a garden hose supporter that shall contain no loose parts and that shall be capable of holding the hose in several desired directions and without the use of clamps.

A further object of the invention is to provide an article so constructed as to be readily inserted into and withdrawn from the ground.

With these and other objects in view, the invention consists in certain novel construction and combination of parts as will hereinafter be fully described and claimed and illustrated in the accompanying drawing which forms a part hereof and in which like figures of reference refer to corresponding parts in all of the views, and it is understood that slight changes may be made without departing from the spirit of the invention.

In the drawing:—

Figure 1 is a front elevation of the device, showing in section, two positions of the hose.

Figure 2 is a side view of the device, showing the hose as being held in an approximately vertical position to form a fountain.

Figure 3 shows a side view, with the hose in a spraying position.

Referring to the drawing:—

The device comprises a supporting rod 10 which is formed with a pointed end 11 for insertion into the ground, while to the upper end of this rod 10 is pivoted a loop or ring 12 by the bolt 13, the ends of said ring 12 being curved up as at 14. This ring 12 adapted to be moved into any desired position as shown in the several views, to support the hose 21 in either a vertical position or at any desired angle, the hose 21 being passed therethrough but not clamped in a positive manner, and so readily removable therefrom.

Below said loop or ring 12, the device is provided with two arms 15 which are secured to the rod 10 by the bolts or rivets 16 and 17, and formed with the curved lower ends 18.

Above the rivet 16 the arms are bent outward as at 19 and their ends are curved around as at 20 to form a handle grip for the device by which it may be inserted and removed from the ground.

The arms 19 being of resilient material may be slightly bent outward by pressure on the handle portion to allow of the insertion of the hose 21 between the arm 19 and the rod 10 whereby it is gripped and will thus support the hose 21 in any desired position or at any angle.

It is understood that the rod 10 while here shown as round in cross section, may be of any desired shape, size and material, and that the arms 15 may also be of any suitable material and of any desired shape, and in place of the curves 20 the upper part of the arms 19 may be of any desired shape so long as they are capable of holding the hose 21 between them and the rod 10.

The part 18 is bent to form a rest for the foot of the operator to force the article into the ground by foot pressure.

The arms 19 are reinforced by the addition of a piece 22 secured in contact with their outer sides.

Having thus described our invention, what we claim as new and desire to secure by Letters Patent, is—

1. A garden hose support, comprising a rod adapted to be inserted into the ground, an adjustable loop pivoted to the top thereof, and a pair of resilient arms secured to the sides of said rod and adapted to retain a hose between the same and said rod.

2. A garden hose support, comprising a rod adapted to be inserted into the ground, an adjustable loop pivoted to the top thereof and adapted to receive the hose, a pair of resilient arms having their lower portions secured to the sides of said rod, their body portion spaced from said rod and adapted to retain the hose between the same and said rod, and their upper portion formed to provide a handle for said support.

3. A garden hose support, comprising a rod adapted to be inserted into the ground, an adjustable loop pivoted to the top thereof and adapted to hold a hose, a pair of resilient arms having their lower portions secured to said rod, foot rests formed on said lower portions, a pair of resilient arms spaced from and secured to said rod, and reinforcing pieces in contact with said arms and secured to said rod.

In testimony whereof we affix our signatures.

FLOYD S. WILBER.
ATWATER W. HOLLISTER.